(12) United States Patent
Chung

(10) Patent No.: US 12,061,894 B2
(45) Date of Patent: Aug. 13, 2024

(54) METHOD FOR DEPLOYING BARE COMPUTERS, ELECTRONIC DEVICE, AND STORAGE MEDIUM

(71) Applicant: HON HAI PRECISION INDUSTRY CO., LTD., New Taipei (TW)

(72) Inventor: Shuo-Yen Chung, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 68 days.

(21) Appl. No.: 17/886,787

(22) Filed: Aug. 12, 2022

(65) Prior Publication Data
US 2023/0053293 A1     Feb. 16, 2023

(30) Foreign Application Priority Data
Aug. 12, 2021   (CN) .......................... 202110926852.3

(51) Int. Cl.
G06F 9/445     (2018.01)
G06F 8/65      (2018.01)

(52) U.S. Cl.
CPC ............ G06F 8/65 (2013.01); G06F 9/44505 (2013.01)

(58) Field of Classification Search
CPC ................................ G06F 8/65; G06F 9/44505
USPC .................................................. 717/168–178
See application file for complete search history.

(56) References Cited

U.S. PATENT DOCUMENTS

| | | | |
|---|---|---|---|
| 2019/0014175 A1* | 1/2019 | Malachowski | H04L 67/1097 |
| 2019/0097900 A1* | 3/2019 | Rodriguez | G06F 11/1484 |
| 2021/0240825 A1* | 8/2021 | Kutt | G06F 21/563 |

FOREIGN PATENT DOCUMENTS

CN     109684032     4/2019

* cited by examiner

*Primary Examiner* — Chuck O Kendall
(74) *Attorney, Agent, or Firm* — ScienBiziP, P.C.

(57) ABSTRACT

A method for deploying bare computers implemented in an electronic device includes starting at least one bare computer to be deployed, and assigning an IP address to the at least one bare computer; downloading a deployment image to the at least one bare computer based on the IP address, and obtaining hardware information of the at least one bare computer based on the deployment image; determining at least one service to be provided by the bare computer according to a preset deployment strategy and the obtained hardware information of the bare computer; and generating a system image according to the at least one service to be provided by the bare computer, and deploying the system image in the bare computer.

17 Claims, 4 Drawing Sheets

---

┌─ 201

Start at least one bare computer to be deployed, and assign an IP address to the at least one bare computer

┌─ 202

Download a deployment image to the at least one bare computer, and obtain hardware information of the at least one bare computer

┌─ 203

Determine at least one service according to a preset deployment strategy and hardware information

┌─ 204

Generate a system image according to the at least one service, and deploy the system image in the bare computer

METHOD FOR DEPLOYING BARE COMPUTERS, ELECTRONIC DEVICE, AND STORAGE MEDIUM

FIELD

The subject matter herein generally relates to server management, and particularly to an electronic device, a method for deploying bare computers, and a storage medium.

BACKGROUND

Edge computing platforms are widely used for Artificial Intelligence (AI), and OpenStack provides development and management solutions for the edge computing platforms, and can deploy bare computers according to user requirements. However, the kernel, the memory file system, and the system image of OpenStack must be pre-configured by users, while being deployed. The pre-configured information is relatively fixed, which may cause low configuration efficiency and lack of flexibility of the bare computer.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
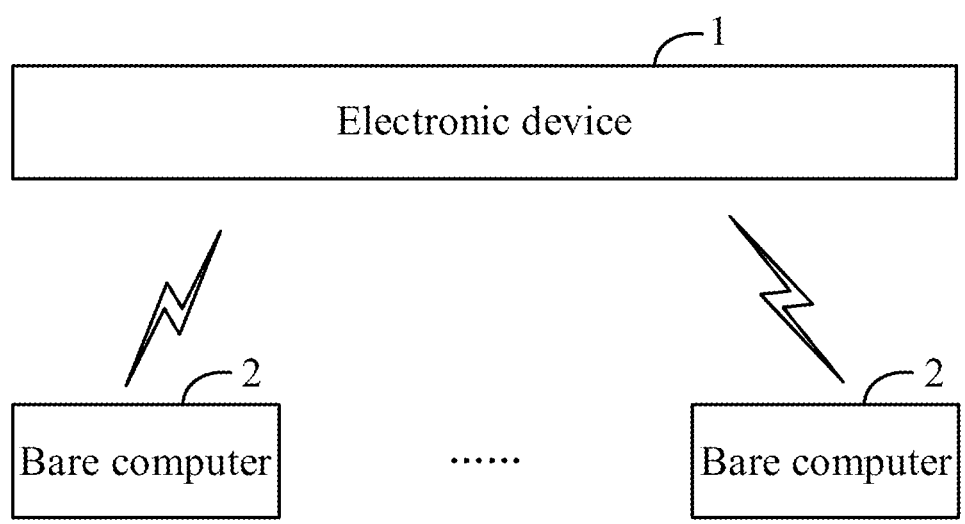
FIG. 1 is a schematic view of an embodiment of an application environment of an electronic device according to the present disclosure.

Multiple embodiments are described in the present disclosure, but the description is exemplary rather than limiting, and there may be more embodiments and implementation solutions within the scope of the embodiments described in the present disclosure. Although many possible combinations of features are shown in the drawings and discussed in the detailed description, many other combinations of the disclosed features are also possible. Unless specifically limited, any feature or element of any embodiment may be used in combination with or in place of any other feature or element of any other embodiment.

When describing representative embodiments, the specification may present methods and/or processes as a specific sequence of steps. However, to the extent that the method or process does not depend on the specific order of steps described in the present disclosure, the method or process should not be limited to the specific order of steps described. As understood by those of ordinary skills in the art, other orders of steps are also possible. Therefore, the specific order of steps set forth in the specification should not be interpreted as limitation to the claims. In addition, the claims for the method and/or process should not be limited to the steps performed in the written order, and those of skilled in the art may readily understand that these orders may vary and still remain within the essence and scope of the embodiments of the present disclosure.

Unless otherwise defined, technical terms or scientific terms used in the embodiments shall have common meanings as construed by those of ordinary skills in the art to which the present disclosure pertains. The terms "first", "second" and the like used in the embodiments of the present disclosure do not represent any order, quantity, or importance, but are merely used to distinguish different components. The terms "include", "contain" or the like mean that elements or articles appearing before such terms cover elements or articles listed after the words and their equivalents without excluding other elements or articles. The terms "connect", "link" or the like are not limited to physical or mechanical connection, but may include electrical connections, whether direct or indirect.

Referring to FIG. 1, an electronic device 1 is illustrated. In one embodiment, the electronic device 1 can communicate with a number of bare computers 2 through a network. The network can be wired network or wireless network, the wireless network can be radio, WI-FI, or cellular network. The cellular network can be a 4G network or a 5G network.

The electronic device 1 may be an electronic device with a bare computer deploying program installed, such electronic device may be as a personal computer, a server, etc., the server may be a single server, a server cluster, or the like. In one embodiment, the electronic device 1 can be a server for cloud computing management based on OpenStack.

In one embodiment, the bare computer 2 may also be a personal computer or a server. The bare computer 2 includes, but is not limited to, a power controller 201, a memory 202, at least one hard disk 203, and a CPU (Central Processing Unit) 204.

Figure 2:
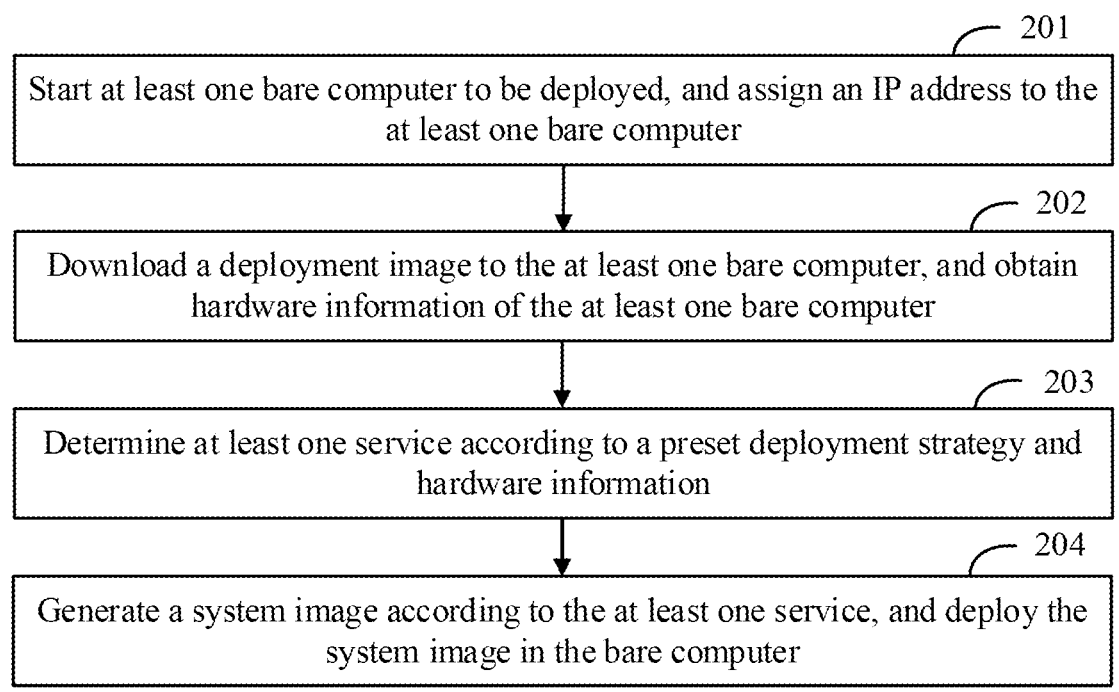
FIG. 2 illustrates a flowchart of an embodiment of a method for deploying bare computers according to the present disclosure.

FIG. 2 illustrates a flowchart of an embodiment of a method for deploying bare computers. The method is provided by way of example, as there are a variety of ways to carry out the method. Each block shown in FIG. 2 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 201.

At block 201, starting at least one bare computer 2 to be deployed, and assigning an IP address to the at least one bare computer 2.

In one embodiment, the method further comprises: detecting whether the at least one bare computer 2 that communicates with the electronic device 1 is newly added at preset time intervals, when it is detected that the at least one bare computer 2 newly communicates with the electronic device 1, starting the at least one bare computer 2 to be deployed, and assigning an IP address to the at least one bare computer 2. In one embodiment, the preset time interval may be one hour.

In one embodiment, the electronic device 1 is applied to an edge server cluster for managing a number of edge servers. The electronic device 1 stores a registry for recording the edge servers that communicate with the electronic device 1. When the at least one bare computer 2 is joined within the edge server cluster, in addition to communicating with the electronic device 1 through the network, the registration information of the at least one bare computer 2 is required to be stored in the registry through the network. The registration information may be a device identification, a MAC address, and the like. If the registration information is newly added to the registry, it is determined that the at least one bare computer 2 newly communicates with the electronic device 1.

In one embodiment, starting at least one bare computer 2 to be deployed includes: starting the bare computer to be deployed by transmitting an IPMI (Intelligent Platform Management Interface) instruction to the at least one bare computer 2. Assigning an IP address to the at least one bare computer 2 includes: obtaining an IP address assigned by a TFTP (Trivial File Transfer Protocol) service based on a DHCP (Dynamic Host Configuration Protocol) service, and further assigning the IP address to the at least one bare computer 2.

Figure 3:
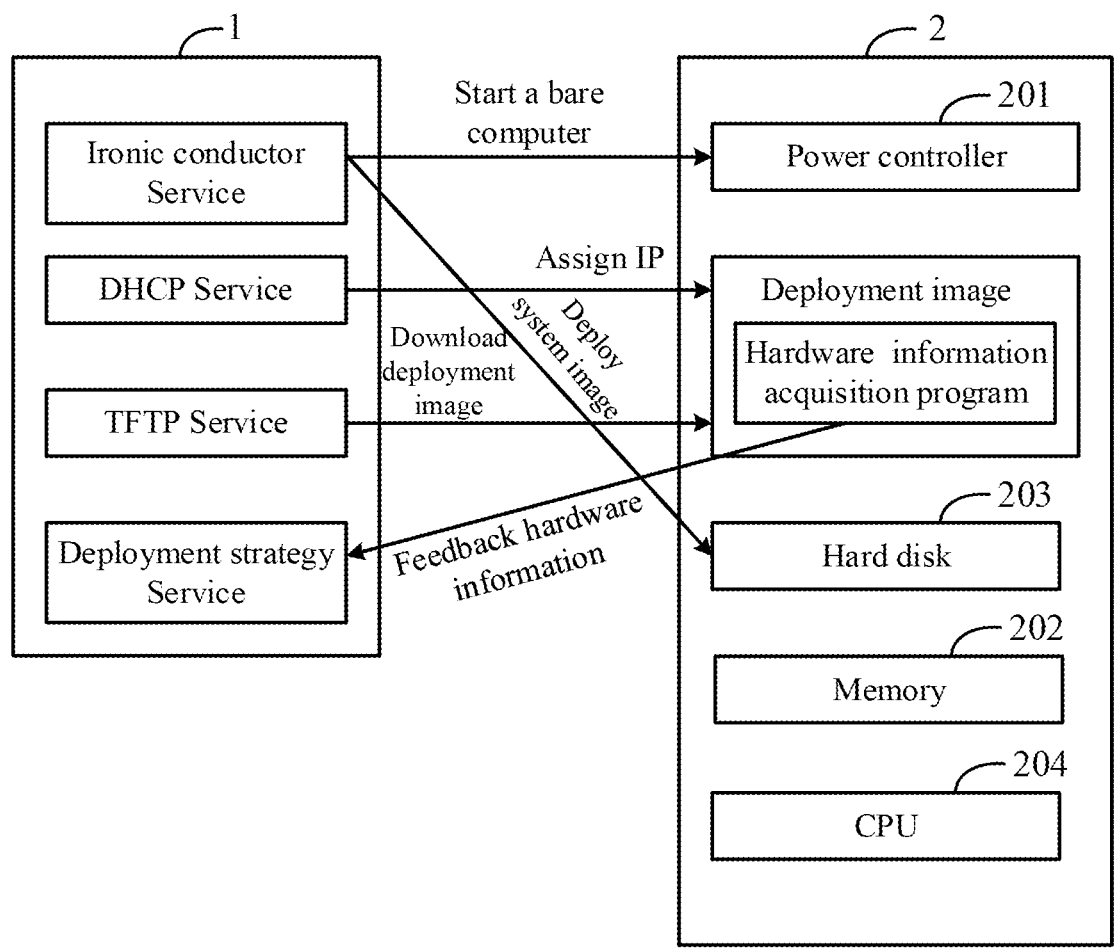
FIG. 3 is a schematic view of an embodiment of interaction between an electronic device and a bare computer according to the present disclosure.

Referring to FIG. 3, in one embodiment, an architecture of the electronic device 1 is OpenStack, the electronic device 1 runs an Ironic Conductor service, a DHCP service, a TFTP service, and a deployment policy service. If the electronic device 1 is a single server, the above services may be modules integrated in the electronic device 1. If the electronic device 1 is a server cluster, each of the above services is provided by a single server.

In detail, the electronic device 1 transmits the IPMI instruction to the power controller 201 of the bare computer 2 through the Ironic Conductor service, and the bare computer 2 to be deployed is turned on through the power controller 201.

In one embodiment, the DHCP service manages the services of the electronic device 1 and the IP addresses of the computers that communicate with the electronic device 1. The DHCP service receives an IP address request transmitted by the bare computer 2, checks whether a MAC address of the bare computer 2 is valid, and returns the IP address to the bare computer 2 if it is determined that the MAC address of the bare computer 2 is valid. The bare computer 2 communicates with the TFTP service through the IP address.

In one embodiment, the DHCP service module may check whether the MAC address of the bare computer 2 is valid by using a regular matching method. For example, an expression used by the regular matching method may be ^([A-Fa-f0-9]{2}[-,:]){5}[A-Fa-f0-9]{2}$. Each character of the MAC address of the bare computer 2 is identified according to a preset format of the MAC address by using the regular matching method.

At block 202, downloading a deployment image to the at least one bare computer 2 based on the IP address, and obtaining hardware information of the at least one bare computer 2 based on the deployment image.

In one embodiment, the TFTP service manages the files of the electronic device 1, including downloading files, configuring files, transferring files, and the like. The electronic device 1 receives, through the TFTP service, a request message sent by the bare computer 2 for obtaining the deployment image, and sends the deployment image to the bare computer 2 in response to the request message.

In one embodiment, the electronic device 1 can manage the process of system deployment of the at least one bare computer 2 through the deployment image, such as monitoring a progress and a status of the system deployment.

In one embodiment, the deployment image at least includes a hardware information acquisition program, and obtaining hardware information of the at least one bare computer 2 based on the deployment image includes: downloading the hardware information acquisition program in the deployment image to the bare computer 2, and obtaining the hardware information of the bare computer 2 by controlling the bare computer 2 to launch the hardware information acquisition program.

In one embodiment, the hardware information includes hardware type and/or hardware attribute. For example, the hardware type includes a memory, a hard disk, a CPU, etc., and the hardware attribute includes a memory capacity, a hard disk capacity, the number of CPU cores, and the like.

In other embodiments, the bare computer 2 may also be pre-installed with the hardware information acquisition program, and when the deployment image is installed on the bare computer 2, the bare computer 2 obtains the hardware information by automatically launching the hardware information acquisition program.

At block 203, determining the service to be provided by the bare computer according to a preset deployment strategy and the hardware information of the bare computer 2.

In one embodiment, the preset deployment strategy includes a relationship between hardware types or hardware attributes of the bare computer 2 and services provided by the bare computer 2, and a relationship between the services provided by the bare computer 2 and configuration files of a system image. For example, the service provided by the bare computer corresponding to an AI acceleration chip includes an inference service of deep learning, and the configuration file of the system image includes a basic configuration file and an inference service configuration file corresponding to the inference service of deep learning.

In one embodiment, if the hardware type of the bare computer 2 includes an AI acceleration chip, the deployment strategy service determines that the service provided by the bare computer 2 corresponding to the AI acceleration chip at least includes the inference services of deep learning according to the preset deployment strategy. If the hardware type of the bare computer 2 includes a GPU, the deployment strategy service determines that the service provided by the bare computer 2 corresponding to the GPU at least includes the training services of deep learning according to the preset deployment strategy. If the hardware type of the bare computer 2 includes a sensor, the deployment strategy service determines that the service provided by the bare computer 2 corresponding to the sensor at least includes the sensing data acquisition services according to the preset deployment strategy.

At block 204, generating a system image according to the service to be provided by the bare computer 2, and deploying the system image in the bare computer 2.

In one embodiment, generating a system image according to the service to be provided by the bare computer 2 includes: determining service configuration files according to the services to be provided by the bare computer 2, and generating the system image according to basic configuration files and the service configuration files.

In one embodiment, the basic configuration files include, but are not limited to, a kernel, a memory file system, and an operating system, for example, the operating system is a Ubuntu system. The service configuration files include an inference engine and a training engine of a deep learning framework, as well as a physical protocol conversion program corresponding to the sensor, a preprocessing program for sensing data, and the like.

In detail, the configuration files corresponding to the hardware information of the bare computer 2 are read through an image generation instruction sent by the Ironic conductor according to a SSH (Secure Shell) protocol, the configuration files include the system configuration files and the service configuration files. The configuration files are arranged into image customization configuration items, the configuration information of the customized image is obtained, and the configuration files corresponding to the bare computer according to the obtained configuration information are read. The configuration information is written into a kickstart (enable fast restart) script file, and the files and installation packages required by the bare computer 2 are written into the rootfs.img file of the image to be created.

Further, the configuration information and image generation instructions based on the image customization service are issued, the corresponding system image based on the configuration information is generated, and the system image is downloaded to the local hard disk of bare computer 2 and mounted to a specified directory. The boot item is modified to enable booting from the hard disk, and the bare computer 2 is restarted for completing automated installation of the system image.

Further, the method includes: detecting whether the hardware information of the bare computer 2 with the deployed system has been updated, and when it is detected that the hardware information of the bare computer 2 has been updated, updating the service to be provided by the bare computer 2 based on the updated hardware information, and based on the above method, re-deploying the bare computer 2 according to the updated service to be provided.

The method for deploying bare computers may automatically deploy the system of the bare computer according to its hardware information, which may improve the deployment efficiency of the bare computers, and provide flexible settings for the system of the bare computer.

Figure 4:
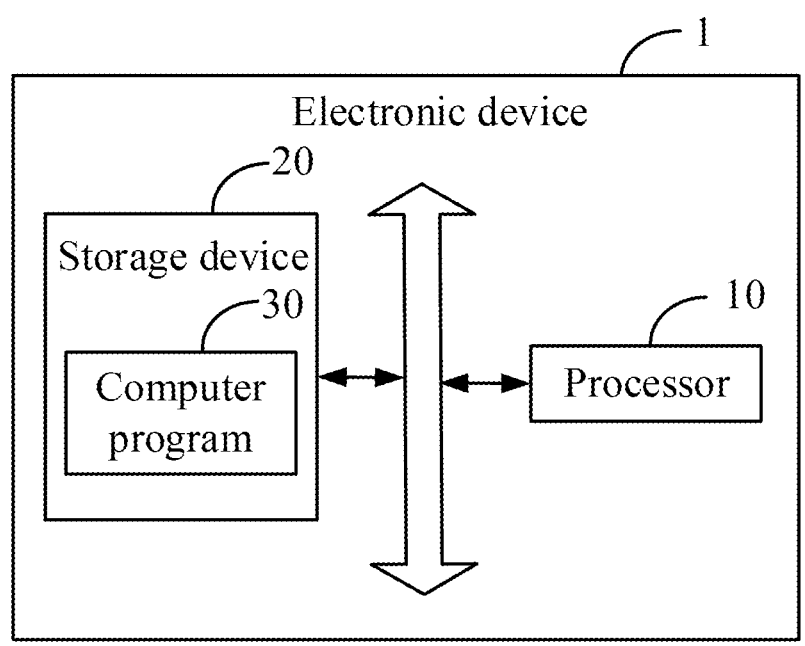
FIG. 4 is a block diagram of an embodiment of the electronic device according to the present disclosure.

FIG. 4 illustrates the electronic device 1 in one embodiment. The electronic device 1 includes, but is not limited to, a processor 10, a storage device 20, and a computer program 30. FIG. 4 illustrates only one example of the electronic device 1. Other examples can include more or fewer components than as illustrated or have a different configuration of the various components in other embodiments.

The processor 10 can be a central processing unit (CPU), a microprocessor, or other data processor chip that performs functions in the electronic device 1.

In one embodiment, the storage device 20 can include various types of non-transitory computer-readable storage mediums. For example, the storage device 20 can be an internal storage system, such as a flash memory, a random access memory (RAM) for the temporary storage of information, and/or a read-only memory (ROM) for permanent storage of information. The storage device 20 can also be an external storage system, such as a hard disk, a storage card, or a data storage medium.

The storage device 20 stores instructions, the processor 10 executes the computer program 30 stored in the storage device 20 for implementing the method for deploying bare computers provided in the embodiments of the present disclosure. The computer program 30 is a bare computer deployment program and includes instructions.

The processor 10 is configured to:
start at least one bare computer 2 to be deployed, and assign an IP address to the at least one bare computer 2;
download a deployment image to the at least one bare computer based on the IP address, and obtain hardware information of the at least one bare computer 2 based on the deployment image;
determine the service to be provided by the bare computer according to a preset deployment strategy and the hardware information of the bare computer 2;
generate a system image according to the service to be provided by the bare computer 2, and deploy the system image in the bare computer 2;
detect whether the hardware information of the bare computer 2 with the deployed system has been updated, and when it is detected that the hardware information of the bare computer 2 has been updated, update the service to be provided by the bare computer 2 based on the updated hardware information, and based on the above method, re-deploy the bare computer 2 according to the updated service to be provided.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. An electronic device comprising:
at least one processor; and
a storage device coupled to the at least one processor and storing instructions for execution by the at least one processor to cause the at least one processor to:
start at least one bare computer to be deployed, and assign an Internet Protocol (IP) address to the at least one bare computer;
download a deployment image to the at least one bare computer based on the IP address, and obtain hardware information of the at least one bare computer based on the deployment image;
determine at least one service to be provided by the at least one bare computer according to a preset deployment strategy and the obtained hardware information of the bare computer, wherein the obtained hardware information comprises hardware types and/or hardware attributes;
in response that a hardware type of the bare computer comprises an AI acceleration chip, determine that at least one service to be provided comprises an inference service of deep learning according to the preset deployment strategy;
in response that the hardware type of the bare computer comprises a GPU, determine that the at least one service to be provided by the bare computer comprises a training service of deep learning according to the preset deployment strategy; and
in response that the hardware type of the bare computer comprises a sensor, determine that the at least one service to be provided comprises a sensing data acquisition service according to the preset deployment strategy; and
generate a system image according to the at least one service to be provided by the at least one bare computer, and deploy the system image in the bare computer.

2. The electronic device according to claim 1, wherein the preset deployment strategy comprises a relationship between the hardware types or the hardware attributes of the bare computer and services provided by the bare computer, and a relationship between the services provided by the bare computer and configuration files of the system image.

3. The electronic device according to claim 2, wherein the at least one processor is further caused to:
detect whether the hardware information of the bare computer with a deployed system has been updated;

in response that the hardware information of the bare computer has been updated, update the service to be provided based on the updated hardware information; and re-deploy the bare computer according to the updated service to be provided.

4. The electronic device according to claim 1, wherein the at least one processor is further caused to:

start the bare computer to be deployed by transmitting an Intelligent Platform Management Interface (IPMI) instruction to the at least one bare computer;

obtain an IP address assigned by a Trivial File Transfer Protocol (TFTP) service based on a Dynamic Host Configuration Protocol (DHCP) service; and assign the IP address to the at least one bare computer.

5. The electronic device according to claim 1, wherein the at least one processor is further caused to:

detect whether the at least one bare computer that communicates with the electronic device is newly added at preset time intervals; and in response that the at least one bare computer communicates with the electronic device is newly added at the preset time intervals, start the at least one bare computer.

6. The electronic device according to claim 1, wherein the at least one processor is further caused to:

download a hardware information acquisition program in the deployment image to the bare computer; and obtain the hardware information of the bare computer by controlling the bare computer to launch the hardware information acquisition program.

7. The electronic device according to claim 1, wherein the at least one processor is further caused to:

determine service configuration files according to the services to be provided by the bare computer, and generate the system image according to basic configuration files and the service configuration files, wherein the basic configuration files comprise a kernel, a memory file system, and an operating system.

8. A method for deploying bare computers implemented in an electronic device comprising:

starting at least one bare computer to be deployed, and assigning an IP address to the at least one bare computer;

downloading a deployment image to the at least one bare computer based on the IP address, and obtaining hardware information of the at least one bare computer based on the deployment image;

determining at least one service to be provided by the at least one bare computer according to a preset deployment strategy and the obtained hardware information of the bare computer, wherein the obtained hardware information comprises hardware types and/or hardware attributes;

in response that a hardware type of the bare computer comprises an AI acceleration chip, determining that at least one service to be provided comprises an inference service of deep learning according to the preset deployment strategy;

in response that the hardware type of the bare computer comprises a GPU, determining that the at least one service to be provided by the bare computer comprises a training service of deep learning according to the preset deployment strategy; and in response that the hardware type of the bare computer comprises a sensor, determining that the at least one service to be provided comprises a sensing data acquisition service according to the preset deployment strategy; and generating a system image according to the at least one service to be provided by the at least one bare computer, and deploying the system image in the bare computer.

9. The method according to claim 8, wherein the preset deployment strategy comprises a relationship between the hardware types or the hardware attributes of the bare computer and services provided by the bare computer, and a relationship between the services provided by the bare computer and configuration files of a system image.

10. The method according to claim 9, further comprising:

detecting whether the hardware information of the bare computer with a deployed system has updated;

in response that the hardware information of the bare computer has updated, updating the service to be provided based on the updated hardware information; and re-deploying the bare computer according to the updated service to be provided.

11. The method according to claim 8, wherein starting at least one bare computer to be deployed, and assigning an IP address to the at least one bare computer comprises:

starting the bare computer to be deployed by transmitting an IPMI (Intelligent Platform Management Interface) instruction to the at least one bare computer;

obtaining an IP address assigned by a TFTP (Trivial File Transfer Protocol) service based on a DHCP (Dynamic Host Configuration Protocol) service; and assigning the IP address to the at least one bare computer.

12. The method according to claim 8, further comprising:

detecting whether the at least one bare computer that communicates with the electronic device is newly added at preset time intervals; and in response that the at least one bare computer newly communicates with the electronic device, starting the at least one bare computer.

13. The method according to claim 8, wherein deploying the system image in the bare computer comprises:

downloading a hardware information acquisition program in the deployment image to the bare computer; and obtaining the hardware information of the bare computer by controlling the bare computer to launch the hardware information acquisition program.

14. The method according to claim 8, wherein generating a system image according to the at least one service to be provided comprises:

determining service configuration files according to the services to be provided by the bare computer, and generating the system image according to basic configuration files and the service configuration files, wherein the basic configuration files comprise a kernel, a memory file system, and an operating system.

15. A computer-readable storage medium having instructions stored thereon, when the instructions are executed by a processor of an electronic device, the processor is configured to perform a method for deploying bare computers, wherein the method comprises:

starting at least one bare computer to be deployed, and assigning an IP address to the at least one bare computer;

downloading a deployment image to the at least one bare computer based on the IP address, and obtaining hardware information of the at least one bare computer based on the deployment image;

determining at least one service to be provided by the at least one bare computer according to a preset deployment strategy and the obtained hardware information of the bare computer, wherein the obtained hardware information comprises hardware types and/or hardware attributes;

in response that a hardware type of the bare computer comprises an AI acceleration chip, determining that at least one service to be provided comprises an inference service of deep learning according to the preset deployment strategy;

in response that the hardware type of the bare computer comprises a GPU, determining that the at least one service to be provided by the bare computer comprises a training service of deep learning according to the preset deployment strategy; and in response that the hardware type of the bare computer comprises a sensor, determining that the at least one service to be provided comprises a sensing data acquisition service according to the preset deployment strategy; and generating a system image according to the at least one service to be provided by the at least one bare computer, and deploying the system image in the bare computer.

16. The storage medium according to claim 15, wherein the preset deployment strategy comprises a relationship between the hardware types or the hardware attributes of the bare computer and services provided by the bare computer, and a relationship between the services provided by the bare computer and configuration files of a system image.

17. The storage medium according to claim 16, wherein the method further comprises:

detecting whether the hardware information of the bare computer with a deployed system has updated;

in response that the hardware information of the bare computer has updated, updating the service to be provided based on the updated hardware information; and re-deploying the bare computer according to the updated service to be provided.

\* \* \* \* \*